March 31, 1925. 1,531,385
J. R. GAMMETER ET AL
METHOD AND APPARATUS FOR MAKING ENDLESS TUBES
Filed July 13, 1923 2 Sheets-Sheet 1
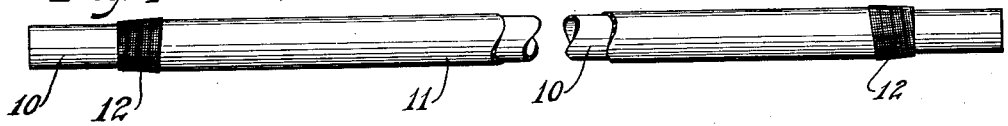
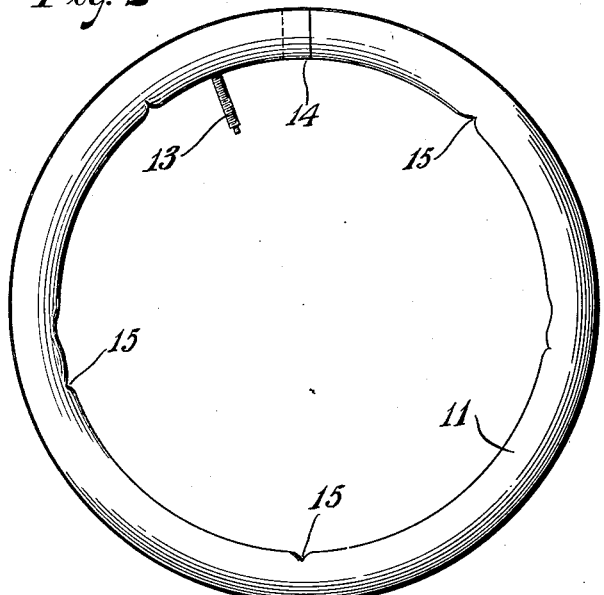
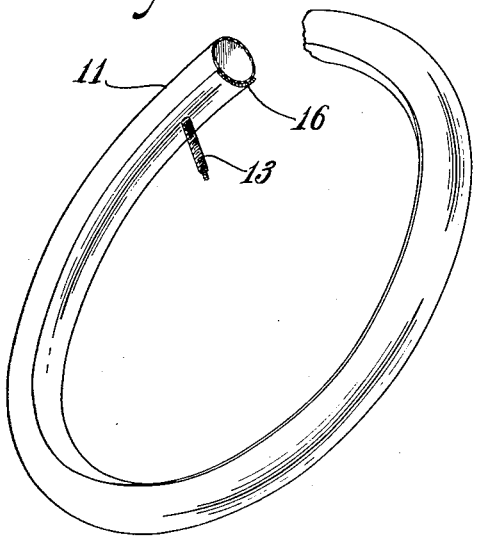
Inventors.
John R. Gammeter.
Abram E. Falor.
By Robert M. Pierson
Atty.

March 31, 1925.                                              1,531,385
J. R. GAMMETER ET AL
METHOD AND APPARATUS FOR MAKING ENDLESS TUBES
Filed July 13, 1923          2 Sheets-Sheet 2

Inventors
John R. Gammeter.
Abram E. Falor.
By Robert M. Pierson
Atty.

Patented Mar. 31, 1925.

1,531,385

UNITED STATES PATENT OFFICE.

JOHN R. GAMMETER AND ABRAM E. FALOR, OF AKRON, OHIO, ASSIGNORS TO THE B. F. GOODRICH COMPANY, OF NEW YORK, N. Y., A CORPORATION OF NEW YORK.

METHOD AND APPARATUS FOR MAKING ENDLESS TUBES.

Application filed July 13, 1923. Serial No. 651,241.

*To all whom it may concern:*

Be it known that we, JOHN R. GAMMETER and ABRAM E. FALOR, citizens of the United States, residing at Akron, in the county of Summit and State of Ohio, have invented a certain new and useful Method and Apparatus for Making Endless Tubes, of which the following is a specification.

This invention relates to the art of manufacturing endless, rubber tubes such as are used within the casings of pneumatic vehicle tires, and more particularly to tubes which are vulcanized while supported substantially in the shape they assume when in use.

An inner tube which is built and entirely vulcanized upon a straight mandrel is disposed to develop kinks or wrinkles on its inner periphery when its ends are spliced to make it endless, this condition being the more pronounced in tubes of large cross-sectional size. The disadvantages of such a tube as compared with a tube vulcanized to final shape, so as snugly to fit the tire casing with even tension at all points, are obvious. The condition mentioned may be avoided by building and vulcanizing the tube upon a transversely split circular mandrel having it sends offset to permit removal of the finished tube, but this method of building tubes has been found to be relatively slow and expensive. Both of these methods require that the free ends of the tube be joined after it is vulcanized and this heretofore has been by the inferior "acid-cure" or by a separate, local, vulcanizing operation, with the attendant danger of over-vulcanizing the adjacent parts of the tube.

The general objects of our invention are to provide an improved, rapid and economical method of making a tube vulcanized to final shape, and improved apparatus for such purpose. A more specific object is to provide an improved method for producing an annular tube having a vulcanized splice. A further object is to eliminate the use of a confining mold for the vulcanizing operation. Still another object is to provide a method and apparatus whereby, with other advantages, a smooth surfaced tube may be produced without requiring the presence of a surfacing mold or mandrel throughout the entire vulcanizing operation.

Of the accompanying drawings:

Fig. 1 is a side elevation of a rubber tube in the first stages of construction, in accordance with our invention, and a mandrel on which it is built, parts being broken away.

Fig. 2 is a side elevation of the same tube after removal from the mandrel and the splicing of its ends to form an annulus.

Fig. 3 is a perspective view showing the tube mounted upon a shallow annular rim and inflated, parts being removed for clearness of illustration.

Figure 4:
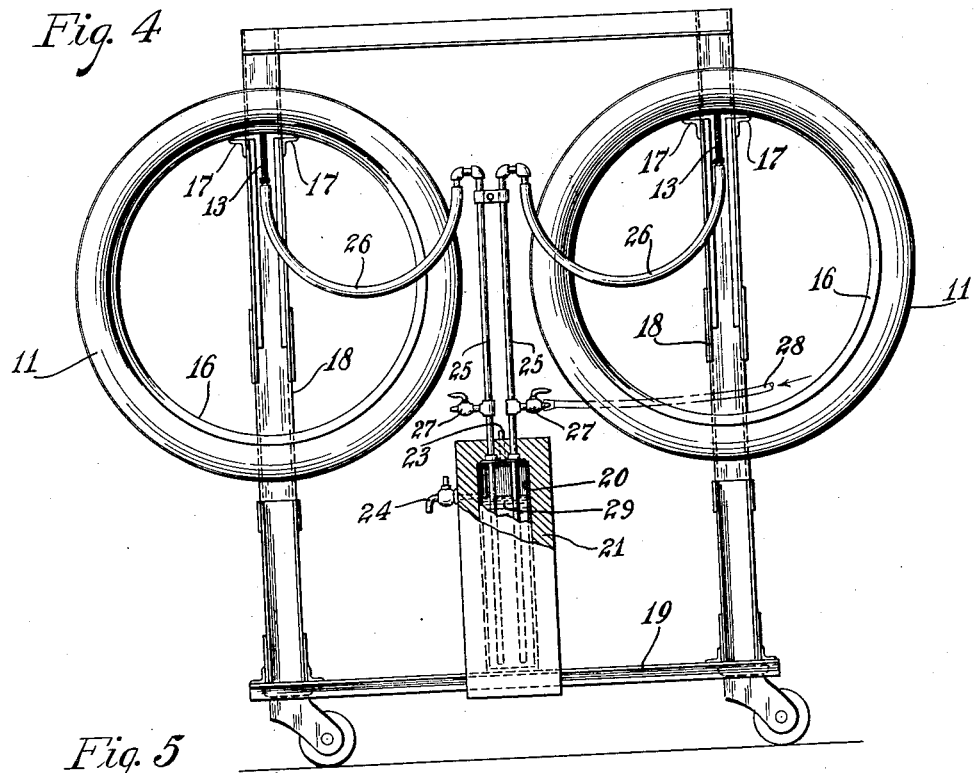
Fig. 4 is a side elevation, with parts broken away and in section, of a truck upon which the tubes are mounted to be vulcanized, and the work thereon.
Figure 5:
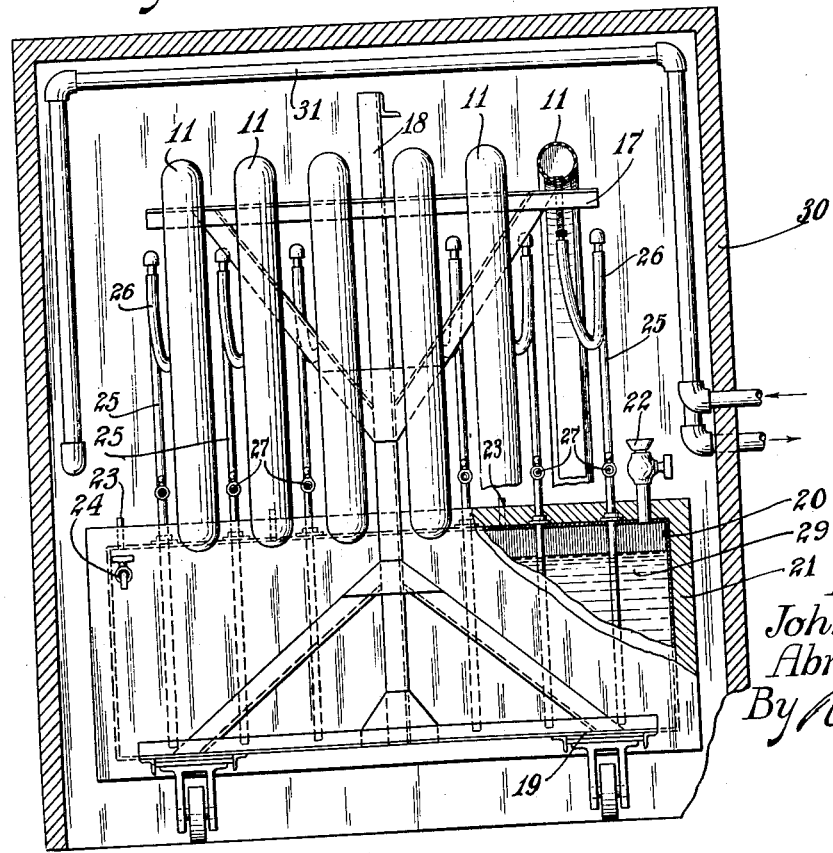
Fig. 5 is an end elevation of the same within a heater, the latter being shown in section, and parts of the truck being sectioned and broken away.

In the manufacture of tubes by our improved method, the first steps comprise the covering of a cylindrical smooth-surfaced mandrel 10 with a tube-forming layer of unvulcanized rubber 11, as by winding a sheet of the rubber upon the mandrel in successive convolutions, the mandrel being adapted to impart a smooth surface or finish to a rubber composition vulcanized in contact therewith. Pocketed air may be ejected from between the plies in any known or suitable manner. The respective ends of the tube are then bound against the mandrel, as by wrapping them with tape 12, 12, in a manner to form a taper or skive when the rubber is softened by heat, all of which is well known in the art and which, in itself, we do not claim as new.

The tube thus prepared is then partially vulcanized while supported on the mandrel, as by heating it in open steam in a suitable vulcanizer (not shown), after which the tube, 11, is stripped from the mandrel 10, being turned inside-out in such removal. A valve stem 13, in any known or suitable manner, is then mounted in the wall of the tube, after which the ends of the tube are joined in a cemented splice 14, the tube at this stage of construction being shown in Fig. 2, wherein 15, 15 indicate kinks or buckles on the inner periphery of the tube, caused by the bending of the latter. The tube is then mounted upon a shallow rigid rim 16 for final vulcanization.

In order that the finished tube may be regular in shape, without buckles or folds, it is inflated with air sufficient to hold it approximately to the size desired in the finished tube, but not unduly to stretch or distort it. The proper pressure for this purpose will of course depend upon the size, thickness and character of the tube.

As the heat required for completing the vulcanizing of the tube would expand the confined air, if the latter were not allowed to escape, and thus destroy the proper ratio of differential pressures, we connect the tube, for final vulcanization, to a suitable relief valve adapted to keep the air within the tube at the desired pressure. The tube is preferably given its final vulcanization in dry heat, so that there is no super-atmospheric pressure on the exterior of the tube to distort or collapse it, the smooth finish imparted to the tube by its partial vulcanization on the mandrel is not destroyed, and no intricate apparatus is necessary to maintain the desired differential of pressures within and on the exterior of the tube.

In the final vulcanizing operation, according to our preferred practice, a plurality of the tubes 11, mounted on their respective rims 16, are suspended from parallel, horizontal, bracket-arms 17, 17 extending laterally from upright supports 18, 18, which are carried by a wheeled truck 19. The relief valve previously mentioned comprises a closed fluid container 20 mounted between the supports 18 on the truck 19, and common to a plurality of tube stations, said container being covered with heat-insulating material 21, to prevent the boiling, evaporation, or undue expansion of its contents by the heat when, as here shown, the container is located within the vulcanizing chamber. Said container is provided with a filling tube 22, air vents 23, 23 and an overflow cock 24. A series of pipes 25, 25 extending into the container 20, through the latter's top, by which they are supported, have their lower ends opening adjacent the bottom of the container, and connected with their upper ends, above the container, are respective lengths of flexible hose 26, 26, for attachment to the valve stems 13 of the respective tubes 11. At an intermediate point in the pipes 25 outside the container 20 are hose-cocks 27, 27, to which are detachably connected lengths of hose such as 28, the latter leading from a source of supply (not shown) of a pressure fluid such as compressed air, and thus being adapted to inflate the tubes 11.

Before the tubes are inflated, the container 20 is filled to a determinate level with a liquid 29 such as water, which submerges the lower ends of the pipes 25 to sufficient depth to establish the desired maximum or blow off pressure of air within the tubes 11, the overflow cock 24 and the open lower ends of the pipes 25 respectively being located at such different levels as to provide the selected head of water for accomplishing this result, excess air injected through the hose lengths 28 or resulting from heat expansion bubbling through the water 29 and escaping by way of the vents 23 or the overflow cocks 24. When the air outlets 23 are provided, a greater maximum pressure within the tubes may be had than that corresponding to the water head measured by the difference in height of the overflow cock and the lower ends of the pipes 25, by closing said overflow cock and filling the container 20 to a higher level with water.

It will be observed that the relief-valve device operates on the U-tube principle with a liquid seal adapted to occupy the supply and discharge legs (pipe 25 and vessel 20) respectively of the modified U-tube, this being a simple and fool-proof apparatus well adapted to multiple tube-curing, but any other suitable relief-valve device might be employed.

In operation, the tubes 11, being mounted as described upon the truck 19, are subjected to final vulcanization in dry heat while the desired pressure therein is maintained by the relief device described, air being supplied through the hose lengths 28 during vulcanization or the tubes being first inflated and the hose cocks 27 closed before the final vulcanization. In the latter case the hose lengths 28 may be detached from the cocks and the tubes vulcanized without any fluid connection running to the outside of the vulcanizer. Such final vulcanization may conveniently be effected in a vulcanizer 30 adapted to receive the truck 19, said vulcanizer being provided with the usual steam coils 31.

After final vulcanization the finished tubes are dismounted from the temporary rims 16 and are ready for use.

By the practice of our invention as described tubes of true annular form, without buckles or wrinkles, and with a vulcanized splice and a smooth external finish may be produced economically and without the use of confining molds.

By the use of a relief valve such as is described the pressure within the tube is kept constant in a quantitative sense, so that the tube is held to the desired size, within reasonable limits. Some expansion of the tube may occur when the latter is heated in the second vulcanizing operation, (if the material of the tube is of such character as to soften to a substantial degree), even though the ratio of pressures be kept constant, but such expansion may be kept within practical limits by choice of compound, degree of vulcanization imparted before removal of the tube from the mandrel, and selection of vulcanizing temperature and differential pressures. While pressures quantitatively constant or unvarying,—that is to say, continuing at the same number of pounds to the square inch, may be used respectively in the interior and on the exterior of the tube during the second vulcanization, with good results, we do not wholly limit our claims to so maintaining the pressure quantitatively constant, since the softening and consequent loss of strength in the tube material obviously may be compensated either by reducing the pressure within or increasing the pressure on the exterior of the tube during the second vulcanization, by expedients not involving invention over the method and apparatus herein described. For convenience of construction and operation, however, we prefer to maintain an unvarying pressure within the tube.

The use of a single relief valve for a plurality of tubes not only permits economy of apparatus and simplicity of operation, but assures uniformity of pressure in the several tubes and consequent uniformity of product.

Our invention is subject to modification within its scope, and we do not wholly limit our claims to the exact procedure or the specific apparatus described.

We claim:

1. The method of making endless rubber tubes which comprises building and partially vulcanizing the tube upon a mandrel, removing it therefrom, joining its ends to form an annulus, and then completing the vulcanization thereof while subjecting it interiorly and exteriorly to determinate differential fluid pressures.

2. The method of making endless rubber tubes which comprises forming the tube in a straight length, partially vulcanizing it, joining its ends to form an annulus, and then completing the vulcanization thereof in open heat while subjecting its interior to a fluid pressure greater than the pressure of the surrounding medium by a determinate amount.

3. The method of making endless rubber tubes which comprises forming the tube in a straight length, partially vulcanizing it, then joining its ends to form an annulus, and vulcanizing it under substantially constant differential fluid pressures with its outer face exposed in a fluid medium.

4. The method of making endless rubber tubes which comprises forming the tube in a straight length, joining its ends to make it endless, and subjecting it to vulcanizing heat while maintaining a fluid pressure within it and with its exterior exposed in a fluid medium of quantitatively constant lesser pressure.

5. The method of making endless rubber tubes which comprises partially vulcanizing the tube on a mandrel, whereby a smooth finish is imparted to the inner surface of the tube, stripping the tube from the mandrel and joining its ends to form an annulus with the smooth side out, and completing vulcanization of the tube in open heat.

6. The method of making endless rubber tubes which comprises partially vulcanizing the tube on a mandrel, whereby a smooth finish is imparted to the inner surface of the tube, stripping the tube from the mandrel and joining its ends to form an annulus with the smooth side out, and completing vulcanization of the tube in open heat.

7. The method of making endless rubber tubes which comprises partially vulcanizing the tube on a mandrel, whereby a smooth finish is imparted to the inner surface of the tube, stripping the tube from the mandrel and joining its ends to form an annulus with the smooth side out, and completing vulcanization of the tube in open heat while subjecting it to differential fluid pressures.

8. The method of making endless rubber tubes which comprises partially vulcanizing the tube on a mandrel, whereby a smooth finish is imparted to the inner surface of the tube, stripping the tube from the mandrel and joining its ends to form an annulus with the smooth side out, and completing vulcanization of the tube in open heat with its outer surface exposed in a gaseous medium, while holding it inflated to a predetermined effective pressure.

8. The method of making endless rubber tubes, which comprises forming the tube upon a mandrel, partially vulcanizing said tube on the mandrel, removing it from the mandrel, joining its ends to form an annulus, and completing the vulcanization of the tube in open heat while maintaining interiorly and exteriorly of the tube quantitatively constant differential fluid pressures.

9. Apparatus for making rubber tubes, said apparatus comprising a vulcanizing chamber, means for supporting the tube therein, and means for maintaining unvarying differential fluid pressures within and without the tube as the temperature thereof is increased.

10. Apparatus for making rubber tubes, said apparatus comprising a vulcanizing chamber adapted to subject the tube to open heat, a conduit communicating with the interior of the tube, and means for maintaining a substantially constant head of liquid in communication with the interior of the vulcanizing chamber and opposed to the fluid pressure within the interior of said conduit.

11. Apparatus for making rubber tubes, said apparatus comprising a vulcanizing chamber adapted to receive the tube, a conduit communicating with the interior of the tube, a liquid container communicating with the vulcanizing chamber, and a liquid therein, said conduit opening into said container below the top level of said liquid.

12. Apparatus for making rubber tubes, said apparatus comprising a vulcanizing chamber adapted to receive the tube, a conduit communicating with the interior of the tube, a liquid container having at a high part thereof a fluid passage from its interior to its exterior, a liquid therein, said conduit opening into said container below the top level of said liquid, and a shut-off, overflow cock for said container located below said fluid passage.

13. Apparatus for making rubber tubes, said apparatus comprising a vulcanizing chamber adapted to subject the tube to open heat, a conduit communicating with the interior of the tube, means for maintaining a substantially constant head of liquid in communication with, and opposed to the fluid pressure within, the interior of said conduit, said head of liquid being subjected to the fluid pressure within the vulcanizing chamber, and a branch, fluid injecting conduit leading into the aforesaid conduit.

14. Apparatus for making rubber tubes, said apparatus comprising a vulcanizing chamber adapted to receive a plurality of the tubes, conduit means communicating with the interiors of said plurality of tubes, and a pressure control device communicating with vulcanizing chamber and said conduit means, common to said plurality of tubes.

15. Apparatus for making rubber tubes, said apparatus comprising a vulcanizing chamber adapted to receive a plurality of the tubes, means for maintaining a head of liquid in communication with said vulcanizing chamber, and conduits leading from the interiors of said tubes and communicating with said liquid below the top level of the latter.

16. Apparatus for making rubber tubes, said apparatus comprising a vulcanizer, a truck adapted to be run into said vulcanizer, means on said truck for supporting the tube, a liquid container having a vent therein mounted on said truck, a liquid therein, and means for establishing closed fluid connection between the interior of said tube and a part of said container below the top level of liquid therein.

17. Apparatus for making rubber tubes, said apparatus comprising a vulcanizer, a truck adapted to be run into said vulcanizer, means on said truck for supporting the tube, and a pressure control device mounted on said truck, said device being insulated against the heat of said vulcanizer, and operatively connected with the interior of said tube.

18. The method of making rubber tubes which comprises forming a straight, tubular length of stock and vulcanizing the same with its outer face exposed in a fluid medium while maintaining within it a fluid pressure so related to that on its exterior as to prevent substantial change of shape or form during vulcanization.

19. The method of making rubber tubes which comprises forming a straight, tubular length of stock and vulcanizing the same in curved form with its outer face exposed in a fluid medium while maintaining within it a fluid pressure so related to that on its exterior as to prevent substantial change of shape or form during vulcanization.

In witness whereof we have hereunto set our hands this 26th day of June, 1923.

JOHN R. GAMMETER.
ABRAM E. FALOR.